US012492088B2

(12) United States Patent
Hayakawa

(10) Patent No.: US 12,492,088 B2
(45) Date of Patent: Dec. 9, 2025

(54) PRINTING APPARATUS AND METHOD OF CONTROLLING PRINTING APPARATUS

(71) Applicant: SEIKO EPSON CORPORATION, Tokyo (JP)

(72) Inventor: Naoto Hayakawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 206 days.

(21) Appl. No.: 18/067,276

(22) Filed: Dec. 16, 2022

(65) Prior Publication Data

US 2023/0192428 A1 Jun. 22, 2023

(30) Foreign Application Priority Data

Dec. 17, 2021 (JP) ................................ 2021-204884

(51) Int. Cl.

*B65H 5/06* (2006.01)
*B41J 13/10* (2006.01)
*B65H 3/52* (2006.01)

(52) U.S. Cl.

CPC ............ *B65H 5/062* (2013.01); *B41J 13/103* (2013.01); *B65H 3/5261* (2013.01)

(58) Field of Classification Search

CPC .... B65H 2404/7231; B65H 2404/7232; B65H 2402/32; B65H 9/00

See application file for complete search history.

(56) References Cited

U.S. PATENT DOCUMENTS

2005/0254103 A1* 11/2005 Sugiyama .............. G03G 15/60 358/474
2011/0012302 A1* 1/2011 Hung ................ H04N 1/00588 312/223.2

FOREIGN PATENT DOCUMENTS

JP 09-77309 A 3/1997
JP 2014064261 A * 4/2014
JP 2020019245 A * 2/2020 .......... B41J 11/0095

OTHER PUBLICATIONS

Translation of JP-2014064261-A (Year: 2025).*

* cited by examiner

*Primary Examiner* — Howard J Sanders
(74) *Attorney, Agent, or Firm* — WORKMAN NYDEGGER

(57) ABSTRACT

A printing apparatus includes a first transport roller pair configured to transport a medium while nipping the medium at a first nip portion, a second transport roller pair disposed downstream of the first transport roller pair and configured to transport the medium while nipping the medium at a second nip portion, and a device disposed between the first transport roller pair and the second transport roller pair in a transport path for the medium, and configured to nip the medium at a third nip portion, wherein a nip force in the third nip portion is weaker than a nip force in the first nip portion, and in a state where the medium is nipped at the first nip portion, a leading end of the medium is aligned with the second nip portion, and then the nipping at the first nip portion is released.

4 Claims, 12 Drawing Sheets

PRINTING APPARATUS AND METHOD OF CONTROLLING PRINTING APPARATUS

The present application is based on, and claims priority from JP Application Serial Number 2021-204884, filed Dec. 17, 2021, the disclosure of which is hereby incorporated by reference herein in its entirety.

BACKGROUND

1. Technical Field

The present disclosure relates to a printing apparatus and a method of controlling the printing apparatus.

2. Related Art

JP-A-9-77309 discloses a known image forming apparatus in which sheets are fed one by one by a feed roller, and a skewed sheet abuts on a nip portion of a pair of a correction roller pair, whereby the skewing is corrected.

In the image forming apparatus described in JP-A-9-77309, the leading end of the sheet is aligned with the nip portion of the correction roller pair. The skewing is corrected with the sheet sliding in a transport path with the leading end aligned with the nip portion. However, in a configuration in which the sheet is nipped by, for example, an image capturing device or the like on a transport path between the feed roller and the correction roller pair, when the leading end of the sheet is aligned with the nip portion of the correction roller pair, the nip force of the image capturing device or the like hinders the sliding of the sheet on the transport path. As a result, deflection of the sheet is formed and this state is maintained.

When the sheet is transported from the correction roller pair in this state, there is a problem in that the deflection formed is gradually released, and the sheet is skewed again.

In a case of a relatively rigid sheet, the deflection of the sheet is not formed in the first place. Thus, to align the leading end of the sheet with the correction roller pair, the sheet needs to slide in the transport path. However, when the sheet is nipped by the image capturing device, the sheet cannot slide in the transport path. Thus, the leading end of the sheet cannot be aligned with the correction roller pair. Thus, there is a problem in that the skewing cannot be corrected.

SUMMARY

A printing apparatus includes a first transport roller pair configured to transport a medium while nipping the medium at a first nip portion, a second transport roller pair that is disposed downstream of the first transport roller pair, and is configured to transport the medium while nipping the medium at a second nip portion, and a device that is disposed between the first transport roller pair and the second transport roller pair in a transport path for the medium, and is capable of nipping the medium at a third nip portion, wherein a nip force in the third nip portion is weaker than a nip force in the first nip portion, and in a state where the medium is nipped at the first nip portion, a leading end of the medium is aligned with the second nip portion, and then the nipping at the first nip portion is released.

A printing apparatus includes a first transport roller pair configured to transport a medium while nipping the medium at a first nip portion, a second transport roller pair that is disposed downstream of the first transport roller pair, and is configured to transport the medium while nipping the medium at a second nip portion, and a device that is disposed between the first transport roller pair and the second transport roller pair in a transport path for the medium, and is capable of nipping the medium at a third nip portion, wherein a nip force in the third nip portion is weaker than a nip force in the first nip portion, the medium is transported to the downstream in a state where a leading end of the medium is nipped at the second nip portion, and then, in a state where the nipping at the first nip portion is released, the medium is transported so that the leading end of the medium is positioned upstream of the second nip portion.

A method of controlling a printing apparatus including a first transport roller pair configured to transport a medium while nipping the medium at a first nip portion, a second transport roller pair that is disposed downstream of the first transport roller pair, and is configured to transport the medium while nipping the medium at a second nip portion, and a device that is disposed between the first transport roller pair and the second transport roller pair in a transport path for the medium, and is capable of nipping the medium at a third nip portion, with a nip force in the third nip portion being weaker than a nip force in the first nip portion, includes in a state where the medium is nipped at the first nip portion, aligning a leading end of the medium with the second nip portion, and then releasing the nipping at the first nip portion.

A method of controlling a printing apparatus including a first transport roller pair configured to transport a medium while nipping the medium at a first nip portion, a second transport roller pair that is disposed downstream of the first transport roller pair, and is configured to transport the medium while nipping the medium at a second nip portion, and a device that is disposed between the first transport roller pair and the second transport roller pair in a transport path for the medium, and is capable of nipping the medium at a third nip portion, with a nip force in the third nip portion being weaker than a nip force in the first nip portion, includes transporting the medium to the downstream in a state where a leading end of the medium is nipped at the second nip portion, and then, in a state where the nipping at the first nip portion is released, transporting the medium with the leading end of the medium positioned upstream of the second nip portion.

DESCRIPTION OF EXEMPLARY EMBODIMENTS

1. First Embodiment

First, a configuration of a printing apparatus 11 will be described. The printing apparatus 11 according to the embodiment is an inkjet apparatus dispensing ink as a liquid onto a medium M to print. For example, the medium M is long roll paper R wound into a roll form, or a sheet in a single sheet form, or the like.

In the following drawings, the printing apparatus 11 is treated as being in a state placed on a horizontal plane. As directions on the horizontal plane, the drawings treat a front-back direction of the printing apparatus 11 as a direction along a Y axis and a left-right direction (or width direction) as a direction along an X axis. Furthermore, a direction vertical (up-down direction) to the horizontal plane is treated as a direction along a Z axis. In addition, a +Y direction is treated as a forward direction, a −Y direction as a backward direction, a +X direction as a right direction, a −X direction as a left direction, a +Z direction as an upward direction and a −Z direction as a downward direction.

Figure 1:
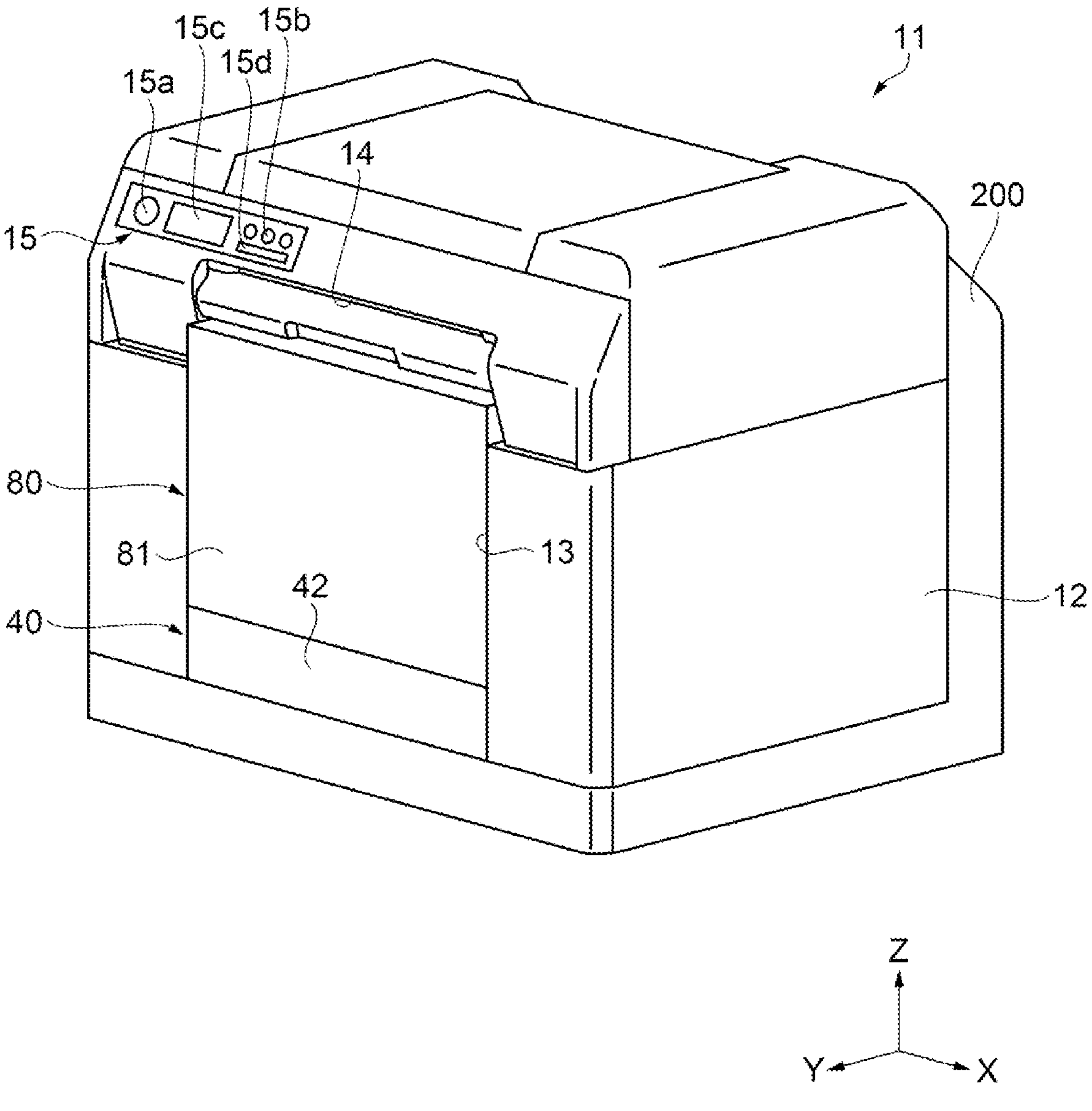
FIG. 1 is a perspective view illustrating an external configuration of a printing apparatus according to a first embodiment.
Figure 2:
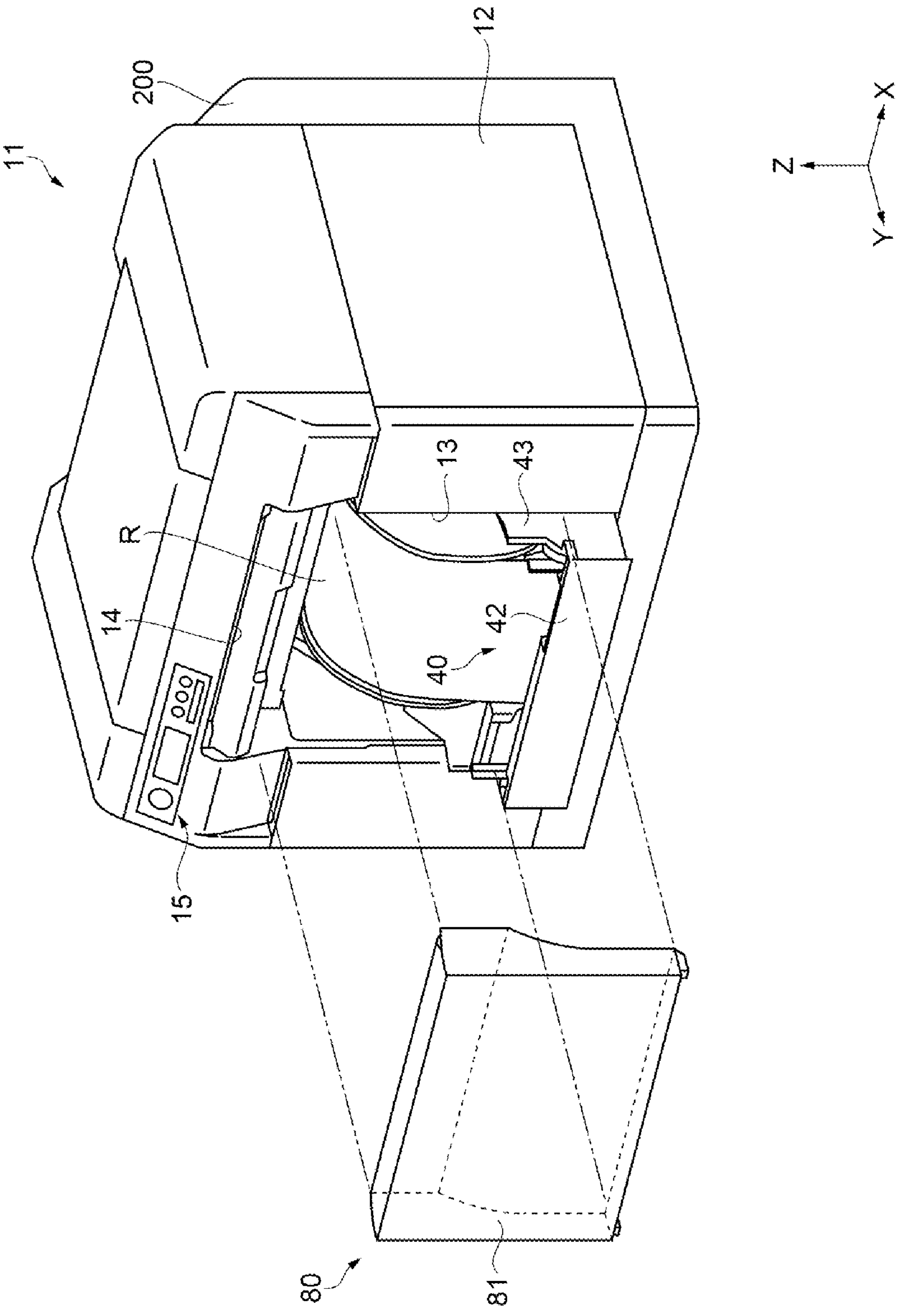
FIG. 2 is a perspective view illustrating an external configuration of the printing apparatus according to the first embodiment.
Figure 3:
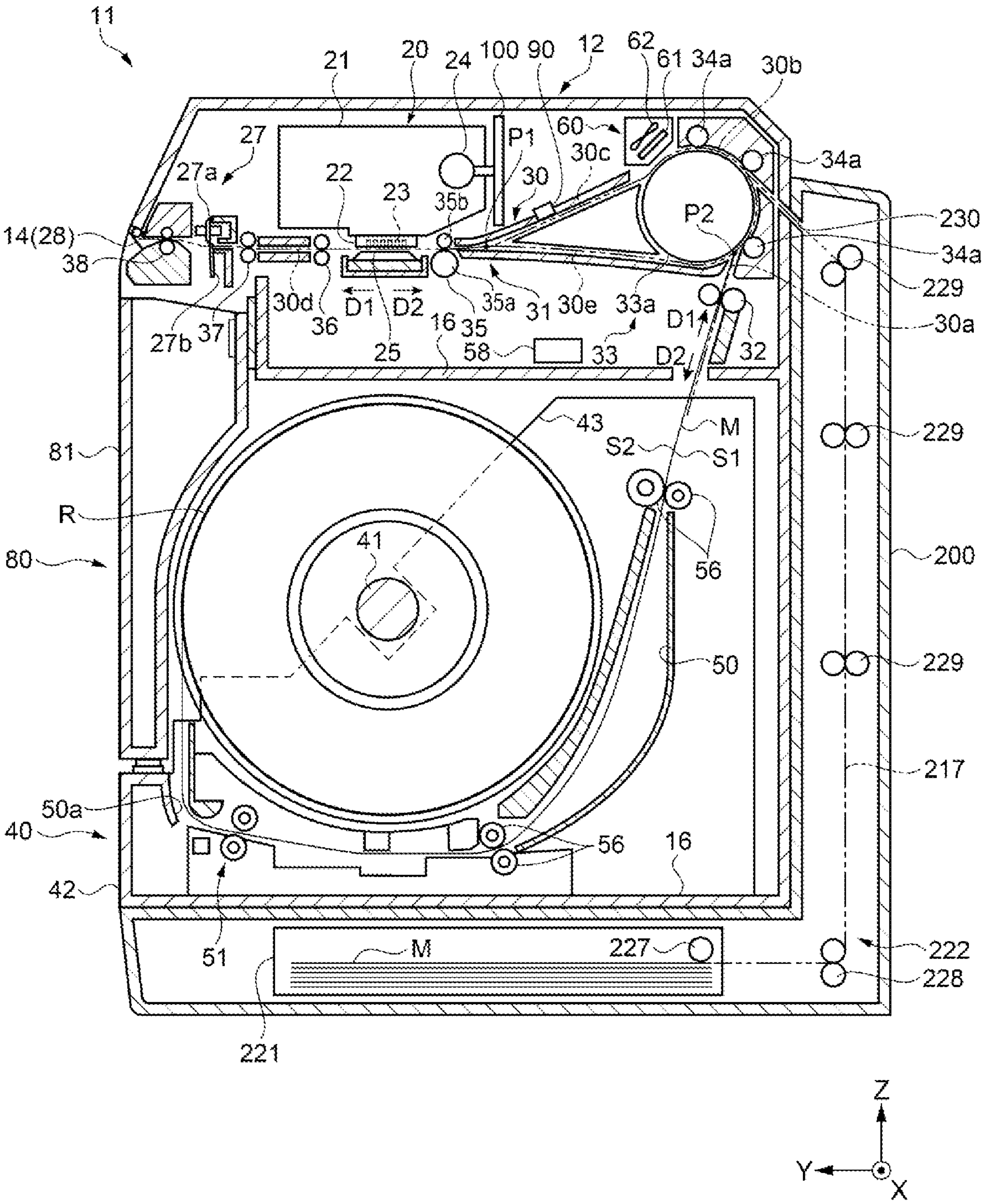
FIG. 3 is a schematic view illustrating an internal configuration of the printing apparatus according to the first embodiment.

As illustrated in FIG. 1, FIG. 2 and FIG. 3, the printing apparatus 11 includes a cuboid housing 12 and a body frame 16 that supports portions of the printing apparatus 11. The housing 12 includes an opening portion 13 opening to a front face. In addition, a discharge unit 28, including a discharge port 14, onto which the printed and cut medium M is discharged is installed in the housing 12.

The printing apparatus 11 includes a storage unit 40 that stores the roll paper R and also feeds out the stored roll paper R. The storage unit 40 is installed such that the storage unit 40 can be pulled from the housing 12 through the opening portion 13 in the forward direction. The storage unit 40 includes a front plate portion 42 that, when stored in the housing 12, constitutes part of the outer packaging of the printing apparatus 11 and a pair of support walls 43 rotatably supporting the roll paper R.

Below the discharge unit 28, a box-shaped cutting waste accommodation unit 80 is provided accommodating cutting waste of the medium M produced by cutting performed by a cutting unit 27. The cutting waste accommodation unit 80 is detachably installed on the front face of the housing 12, forward of the roll paper R. The cutting waste accommodation unit 80 is attached to the housing 12, sealing the opening portion 13. The cutting waste accommodation unit 80 includes an outer wall 81 that, when attached to the housing 12, constitutes part of the outer packaging of the printing apparatus 11.

When the cutting waste accommodation unit 80 is detached from the housing 12, the storage unit 40 can be pulled out of the housing 12. With the storage unit 40 pulled out of the housing 12, the roll paper R can be replaced.

Further, an operation unit 15 for operating the printing apparatus 11 is provided on the front of the housing 12. The operation unit 15 is a panel that is long in the direction along the X axis and is provided with a power button **15*a* operated when turning the printing apparatus 11 on or off, an input button 15*b* capable of inputting various types of operation information and an operation panel 15*c* provided with a display of an operation status of the printing apparatus 11 or the like, for example, or an operation button for the printing apparatus 11. The operation panel 15*c* is a touchscreen panel. Additionally, a speaker 15*d*** is provided emitting sound to an exterior.

As illustrated in FIG. 3, the printing apparatus 11 includes a transport path 30 (illustrated by a double dot dashed line in the drawing) on which the medium M is transported. The printing apparatus 11 includes a transport unit 31 transporting the medium M along the transport path 30, a printing unit 20 printing on the medium M, and the cutting unit 27 cutting the medium M.

The printing unit 20 prints on the medium M transported from the storage unit 40. The printing unit 20 includes a head 22 having nozzles 23 dispensing ink toward the medium M and a carriage 21 on which the head 22 is mounted. The carriage 21 is supported by a guide frame 100 extending along the X axis and a guide shaft 24 attached to the guide frame 100 and extending along the X axis. The carriage 21 is movable along the guide shaft 24 with a drive source such as a motor. That is, the carriage 21 is capable of reciprocating in a direction along the X axis. A support unit 25 supporting the medium M is provided at a position opposite the head 22.

By dispensing ink while reciprocating together with the carriage 21 in a width direction of the medium M, the head 22 prints on the medium M supported by the support unit 25. In the embodiment, a serial head-type recording unit in which the head 22 reciprocates in the width direction was given as an example of the printing unit 20, but the printing unit 20 may be a line head-type printing unit in which the head 22 is fixedly arranged extending in the width direction.

The transport path 30 is a space in which the medium M can move and is configured by a plurality of members. The transport path 30 runs from the storage unit 40 located furthest upstream and feeding out the roll paper R, to the discharge unit 28 (discharge port 14) located furthest downstream. The printing unit 20, the support unit 25 and the like are disposed on the transport path 30.

The cutting unit 27 is located downstream of the support unit 25 and upstream of the discharge port 14. The cutting unit 27 of the embodiment includes a movable blade **27*a* capable of reciprocating in the width direction (left-right direction) and a fixed blade 27*b* that does not move. The movable blade 27*a* is provided above the transport path 30 and the fixed blade 27*b* is provided below the transport path 30. The cutting unit 27 cuts the medium M at a cutting position across the width direction. The cutting position is the position of a blade edge of the fixed blade 27*b***.

The transport path 30 of the embodiment includes, from upstream in the transport direction of the medium M, a first path **30*a* on which the medium M fed out from the roll paper R is transported, a curved path 30***b* on which the medium M is transported while curving, a second path 30*c* (corresponding to the transport path) on which the medium M is transported toward the head 22 (support unit 25) and a third path 30*d* on which the medium M is transported from downstream of the support unit 25 toward the discharge unit 28.

Furthermore, the printing apparatus 11 according to the embodiment includes an inversion path 30*e*. The inversion path 30*e* is a passage connecting a branch point P1 branching from the second path 30*c* and a merge point P2 where the inversion path 30*e* merges into the first path 30*a*. In the transport direction of the medium M transported via the curved path 30*b*, the merge point P2 is located upstream of the branch point P1. That is, the inversion path 30*e* merges upstream of the curved path 30*b*. The inversion path 30*e* is a path for inverting a medium M in a single sheet form and printing on both surfaces of the medium M.

The transport unit 31 transports the medium M along the transport path 30 from the storage unit 40, past the printing unit 20, to the cutting unit 27 and the discharge unit 28. The transport unit 31 includes a feed roller pair 32 provided on the first path 30*a*, a first transport roller pair 33 forming the curved path 30*b*, and a second transport roller pair 35 disposed downstream of the first transport roller pair 33.

The first transport roller pair 33 includes a middle roller 33*a* and driven rollers 34*a* arranged along the outer circumference surface of the middle roller 33*a* of the curved path 30*b*. The driven rollers 34*a* are arranged at positions facing the middle roller 33*a*, and are driven to rotate by the rotation of the middle roller 33*a*. In the embodiment, a plurality of the driven rollers 34*a* (three in the embodiment) are provided. Accordingly, the medium M can be smoothly transported along the curved path 30*b*.

The second transport roller pair 35 includes an upstream transport driving roller 35*a* and an upstream transport driven roller 35*b* that is arranged at a position facing the upstream transport driving roller 35*a*, and is driven to rotate by the rotation of the upstream transport driven roller 35*a*.

The transport unit 31 further includes, on the third path 30*d*, a downstream first transport roller pair 36, a downstream second transport roller pair 37, and a downstream third transport roller pair 38. The downstream second transport roller pair 37 is located upstream of the cutting unit 27. The downstream third transport roller pair 38 is located downstream of the cutting unit 27.

Here, a configuration of the storage unit 40 will be described.

The storage unit 40 has the roll paper R rotatably supported via a support shaft 41 extending in a width direction of the housing 12. The support shaft 41 is configured to rotationally drive in both forward and reverse directions. Thus, the roll paper R is driven to rotate in both the forward and reverse directions via the support shaft 41. Furthermore, the storage unit 40 is provided with a roll paper transport track 50 for transporting the medium M fed out from the roll paper R toward the first path 30*a*.

The roll paper transport track 50 extends downward from a front side of the roll paper R that is supported via the support shaft 41 and then bends in the backward direction, goes around the downward direction and backward direction of the roll paper R and extends to a position higher than the roll paper R, moving in the upward direction to the first path 30*a*.

The roll paper transport track 50 has a bent portion 50*a* bending at substantially a right angle at an upstream end portion of the roll paper transport track 50, that is, at a position forward and diagonally downward of the roll paper R on the roll paper transport track 50. A decurling mechanism 51 is provided downstream of the bent portion 50*a* of the roll paper transport track 50, the decurling mechanism 51 performing decurling that corrects roll memory of the medium M fed out from the roll paper R.

On the downstream of the decurling mechanism 51 on the roll paper transport track 50, a roll paper transport roller pair 56 imparting transport force to the roll paper R is installed with suitable spacing. When the roll paper transport roller pair 56 drives and rotates, the medium M is fed out from the roll paper R and transported to the first path 30*a*.

The roll paper transport roller pair 56, the feed roller pair 32, the first transport roller pair 33, the second transport roller pair 35, the downstream first transport roller pair 36, the downstream second transport roller pair 37, and the downstream third transport roller pair 38 transport the medium M by rotating in a state where the medium M is between the rollers.

The rollers of the transport unit 31 transport the medium M from the upstream to the downstream upon being driven to rotate in the forward direction, and transport the medium M from the downstream to the upstream upon being driven to rotate in the reverse direction. In the embodiment, the direction going downstream along the transport path 30 is referred to as a downstream direction D1, and a direction opposite to the downstream direction D1 is referred to as an upstream direction D2.

The printing apparatus 11 includes a heating unit 60 heating the transported medium M. The heating unit 60 is positioned facing the middle roller 33*a* installed on the curved path 30*b*. The heating unit 60 is installed immediately downstream of the furthest downstream driven roller 34*a* among the three driven rollers 34*a*. The heating unit 60 is configured to correct a curl memory of the medium M. The heating unit 60 of the embodiment includes a heater 61 generating heat and a fan 62 blowing the heat generated by the heater 61 onto the medium M.

The printing apparatus 11 has a device disposed on the transport path 30 going from the storage unit 40 to the discharge unit 28 past the printing unit 20. The device is used for purposes other than transportation of the medium M. The device of the embodiment is an image capturing device 90. The image capturing device 90 is a device capable of reading information about the medium M. The image capturing device 90 is disposed between the first transport roller pair 33 and the second transport roller pair 35 on the second path 30*c*.

The second path 30*c* is inclined downward toward a dispensing surface (the end surface of the head 22 in the −Z direction) from which the ink is dispensed from the head 22 of the printing unit 20, from the upper end portion of the curved path 30*b*. At least part of the image capturing device 90 is disposed between the upper end portion of the curved path 30*b* and the dispensing surface of the head 22, in the height direction. In the embodiment, the image capturing device 90 is disposed between the upper end portion of the curved path 30*b* and the dispensing surface of the head 22. In other words, the image capturing device 90 is disposed between the upstream transport driving roller 35*a* and the middle roller 33*a* on the second path 30*c*. With this configuration, the printing apparatus 11 can have a small dimension in the height direction. Furthermore, miniaturization of the printing apparatus 11 can be achieved.

The image capturing device 90 can capture an image of the printed medium M. For example, the image capturing device 90 reads a test pattern and the like printed by the printing unit 20. The image capturing device 90 can capture an image of a width direction region of the medium M. The image capturing device 90 is arranged at a position more separated from the discharge unit 28 (discharge port 14) to be less likely to be affected by external disturbance light, so that the image capturing function can be guaranteed.

Figure 4:
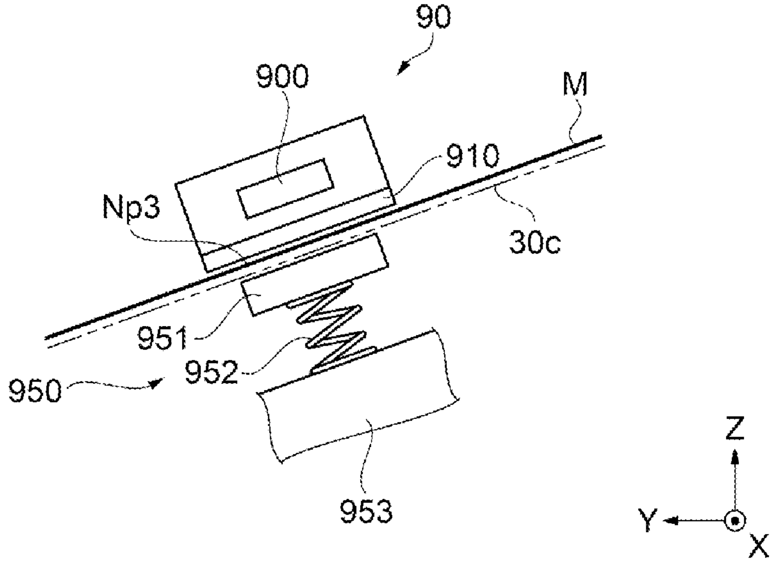
FIG. 4 is a schematic view illustrating a configuration of an image capturing device according to the first embodiment.

The image capturing device 90 includes a contact image sensor (CIS) module 900 as illustrated in FIG. 4. The CIS module 900 includes a light source such as a light-emitting diode (LED) that irradiates the medium M with light, a photoreceptor element such as a complementary metal-oxide semiconductor (CMOS) sensor that receives the light reflected from the medium M, and a contact glass 910 that comes into contact with the medium M. The medium M is transported while being in contact with a transmission surface of the contact glass 910. The light source irradiates the medium M with light via the contact glass 910, and the photoreceptor element reads the light reflected from the medium M.

The CIS module 900 of the embodiment is disposed to extend along the X axis to correspond to the width dimension of the medium M. The CIS module 900 can collectively read a range corresponding to the width dimension of the medium M.

The image capturing device 90 includes a pressing unit 950 that biases the medium M in a direction to be pressed against the contact glass 910 of the CIS module 900. The pressing unit 950 is provided at a position facing the contact glass 910.

The pressing unit 950 includes a pressing plate 951 that can come into contact with the medium M, and a pressing spring 952 that biases the pressing plate 951 in a direction toward the contact glass 910. The pressing spring 952 is coupled to a fixing member 953.

A surface of the pressing plate 951 to be in contact with the medium M is a flat surface. The pressing plate 951 is disposed to extend along the X axis. The pressing plate 951 faces the transmission surface of the contact glass 910 of the CIS module 900 with the second path 30*c* provided in between.

In the image capturing device 90, a third nip portion Np3 is formed where the medium M is nipped by the contact glass 910 and the pressing plate 951. The third nip portion Np3 will be described later.

For example, the image capturing device 90 captures an image of a test pattern. The test pattern is a pattern obtained by dispensing ink from nozzles 23 of the printing unit 20, and includes a plurality of sets of straight lines corresponding to the respective nozzles 23. With the test pattern printed, the dispensing status of the nozzles 23 can be checked. In the embodiment, the image capturing device 90 acquires image data on the test pattern, and a control unit 58 determines whether the dispensing status of the nozzles 23 is good or bad based on the image data acquired. Print processing is executed when the control unit 58 determines that the dispensing status of the nozzles 23 is good. On the other hand, maintenance processing such as cleaning can be executed, when the dispensing status of the nozzles 23 is determined to be bad due to missing nozzle (missing dot) or the like.

The printing apparatus 11 of the embodiment is configured to perform print on the medium M in a single sheet form. Also, double-sided printing can be performed on the medium M in a single sheet form.

In addition, the printing apparatus 11 has an accommodating carrier 200 set, on the outer surface of the housing 12, to accommodate a cassette 221 that accommodates the cut-sheet medium M. The accommodating carrier 200 is capable of transporting the medium M.

The accommodating carrier 200 has a feeding unit 222 transporting the medium M accommodated in the cassette 221 toward the curved path 30*b*.

The feeding unit 222 includes a pickup roller 227 feeding out the topmost medium M of the mediums M accommodated in a stacked state in the cassette 221, a separating roller pair 228 separating the medium M fed out by the pickup roller 227 into one sheet at a time, and a transport roller pair 229 transporting the medium M along a single-sheet transport path 217 toward the curved path 30*b*.

On a downstream end of the single-sheet transport path 217, a communicating passage 230 is provided communicating with the curved path 30*b*. The medium M transported from the cassette 221 is transported along the single-sheet transport path 217 and merges into the curved path 30*b* via the communicating passage 230. The medium M that has merged into the curved path 30*b* is transported toward the printing unit 20 by the transport unit 31.

The medium M printed by the printing unit 20 can be transported in the upstream direction D2, inverted through the inversion path 30*e*, and transported in the downstream direction D1 to the printing unit 20, to have the other surface printed. Thus double-sided printing can be performed.

When the medium M in a single sheet form is printed, the image capturing device 90 is capable of reading an image formed on the medium M. For example, in a case where the medium M is a postcard, information such as a frame where a zip code is written, an address, or the like printed on the postcard can be read. Thus, front and back surfaces of the medium M can be detected, the orientation of the medium M, and the like can be detected.

Next, a skew correction mechanism 190 of the printing apparatus 11 will be described.

Figure 5:
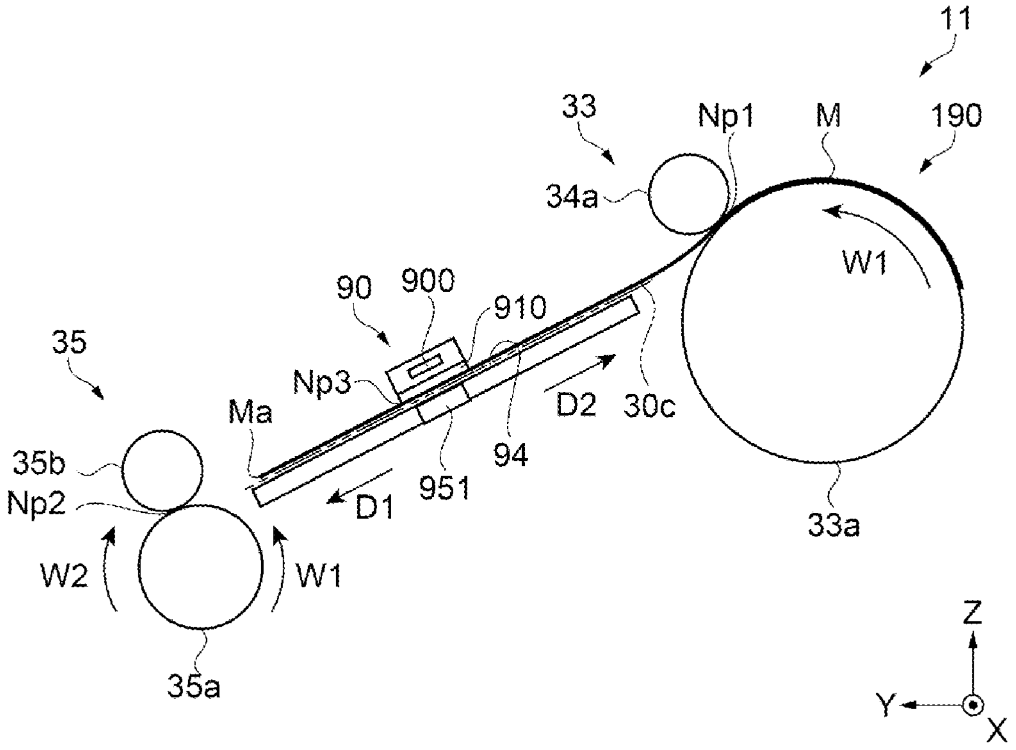
FIG. 5 is a schematic view illustrating a configuration of a skew correction mechanism according to the first embodiment.

As illustrated in FIG. 5, the printing apparatus 11 includes the skew correction mechanism 190. The skew correction mechanism 190 is a mechanism for performing a skew correction operation for the medium M.

The skew correction operation is an operation of making the extending direction of a leading end Ma of the medium M match the extending direction of the second transport roller pair 35 before the printing is performed on the medium M, to suppress inclination of the print position on the medium M relative to the leading end Ma of the medium M. The extending direction of the second transport roller pair 35 is the same as the width direction of the printing apparatus 11 (direction along the X axis), that is, the movement direction of the carriage. Thus, if the extending direction of the leading end Ma of the medium M is the same as the extending direction of the second transport roller pair 35, the extending direction of the leading end Ma of the medium M is the same as the width direction of the printing apparatus 11. With the medium M in this state transported by the second transport roller pair 35, the medium M in a skew corrected state can be transported to the printing unit 20.

The skew correction mechanism 190 includes the first transport roller pair 33, the second transport roller pair 35, and the image capturing device 90. The first transport roller pair 33 includes the middle roller 33*a* serving as a driving roller and the driven rollers 34*a*. The middle roller 33*a* and the driven rollers 34*a* of the first transport roller pair 33 form a first nip portion Np1 where the medium M is nipped. In the first nip portion Np1, a nip force for nipping and holding the medium M is imparted between the driven rollers 34*a* and the middle roller 33*a*. The medium M can be transported using the nip force in the first nip portion Np1.

The second transport roller pair 35 includes the upstream transport driving roller 35*a* and the upstream transport driven roller 35*b*. The upstream transport driving roller 35*a* and the upstream transport driven roller 35*b* of the second transport roller pair 35 form a second nip portion Np2 where the medium M is nipped. In the second nip portion Np2, a nip force for nipping and holding the medium M is imparted between the upstream transport driving roller 35*a* and the upstream transport driven roller 35*b*. The medium M can be transported using the nip force in the second nip portion Np2.

With the middle roller 33*a* rotating in a forward direction W1, the first transport roller pair 33 transports the medium M in the downstream direction D1 that is the transport direction. The second transport roller pair 35 is disposed downstream of the first transport roller pair 33 in the transport direction, and transports the medium M in the downstream direction D1 that is the transport direction, with the upstream transport driving roller 35*a* rotating in the forward direction W1. The second transport roller pair 35 is configured to transport the medium M in the upstream direction D2 that is the transport direction, with the upstream transport driving roller 35*a* rotating in a reverse direction W2.

Figure 6:
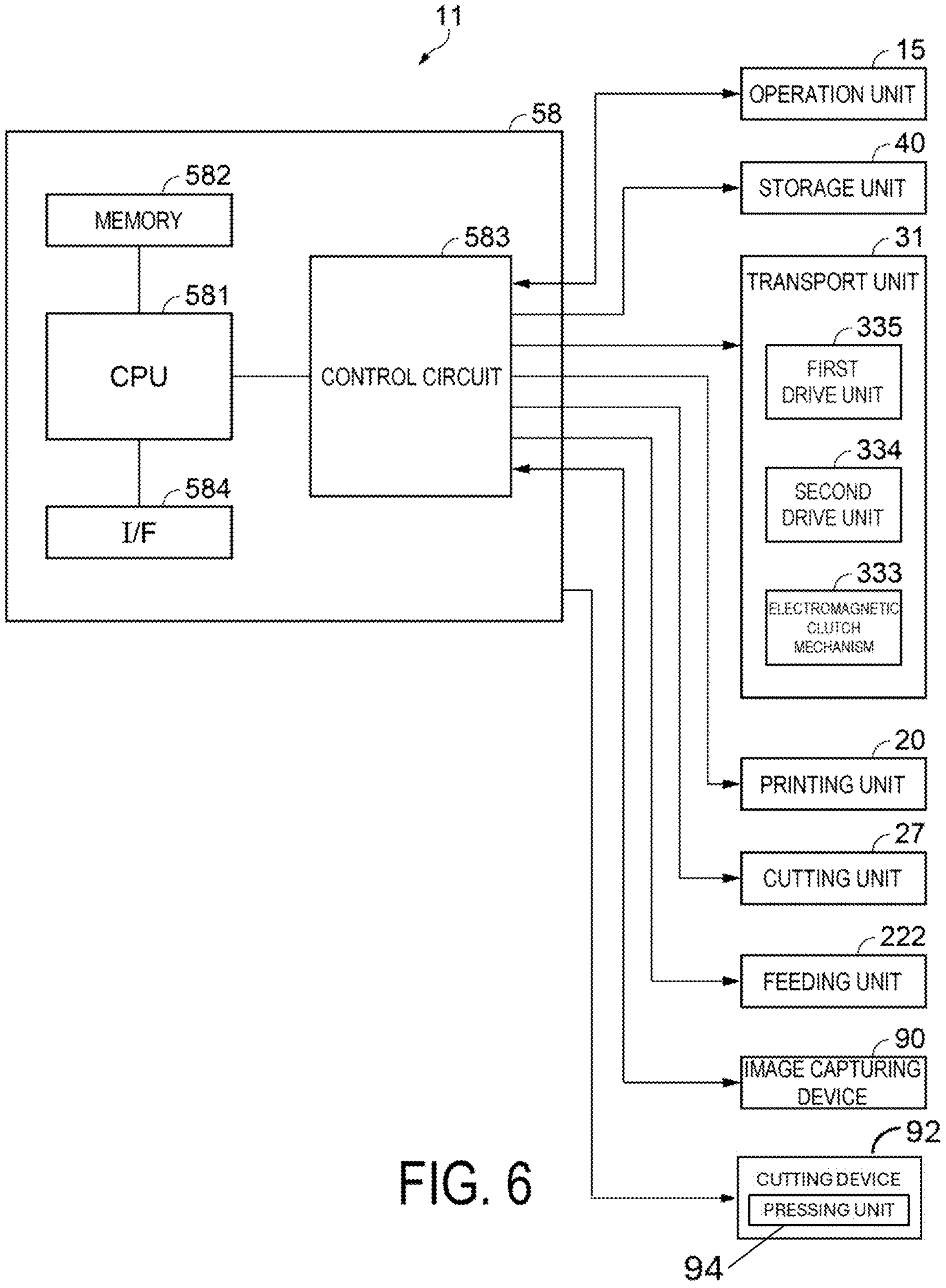
FIG. 6 is a block diagram illustrating a control configuration of the printing apparatus according to the first embodiment.

The printing apparatus 11 of the embodiment includes a first drive unit 335 that drives the upstream transport driving roller 35*a* and a second drive unit 334 that drives the middle roller 33*a* (FIG. 6). The first drive unit 335 and the second drive unit 334 are motors for example.

The middle roller 33*a* is provided with an electromagnetic clutch mechanism 333. Specifically, the power from the second drive unit 334 is configured to transmit via the electromagnetic clutch mechanism 333. In the electromagnetic clutch mechanism 333, a coil is disposed. Using electromagnetic force produced when the coil is energized for example, the power from the second drive unit 334 is transmitted to the middle roller 33*a*, so that the middle roller 33*a* can rotate. When the energization of the coil stops, the electromagnetic force is no longer produced. As a result, the power supply from the second drive unit 334 to the middle roller 33*a* is cut off. Thus, the middle roller 33*a* is not driven to rotate, and is in a free rotating state together with the driven rollers 34*a*.

The image capturing device 90 is disposed between the first transport roller pair 33 and the second transport roller pair 35 on the second path 30*c*. The third nip portion Np3 is formed where the medium M is nipped, by the contact glass 910 and the pressing plate 951. In the third nip portion Np3, a nip force for nipping and holding the medium M is imparted between the contact glass 910 and the pressing plate 951. The nip force in the third nip portion Np3 is weaker than that in the first nip portion Np1 and the second nip portion Np2. For example, the nip force in the third nip portion Np3 is about 50% of that in the first nip portion Np1 and the second nip portion Np2. Specifically, the nip force in the third nip portion Np3 of the image capturing device 90 is only sufficient for holding the medium M so that information thereof can be read in the CIS module 900, and does not contribute to the transport force for the medium M.

The skew correction mechanism 190 includes a transport guide surface 94 that guides the medium M, between the first transport roller pair 33 and the second transport roller pair 35 on the second path 30*c*.

Next, the control configuration of the printing apparatus 11 will be described.

As illustrated in FIG. 6, the printing apparatus 11 includes the control unit 58 controlling various operations performed by the printing apparatus 11. The control unit 58 includes a CPU 581, a memory 582, a control circuit 583 and an interface (I/F) 584. The CPU 581 is an arithmetic processing device. The memory 582 is a storage device ensuring a region for storing programs of the CPU 581, a working region and the like and includes a storage element such as a RAM or EEPROM. Upon acquiring print data or the like from the exterior such as an information processing terminal via the I/F 584, the CPU 581 performs calculation based on a program, and controls driving units or the like via the control circuit 583.

The feed roller pair 32, the middle roller 33*a*, the second transport roller pair 35, the downstream first transport roller pair 36, the downstream second transport roller pair 37, the downstream third transport roller pair 38, the roll paper transport roller pair 56, and the transport roller pair 229 forming the transport unit 31 are each configured to be drive controllable.

Next, a method of controlling the printing apparatus 11 will be described. Specifically, a method of controlling the skew correction mechanism 190 will be described. In the embodiment, a method of skew correction for the medium M in a single sheet form will be described.

Figure 7A:
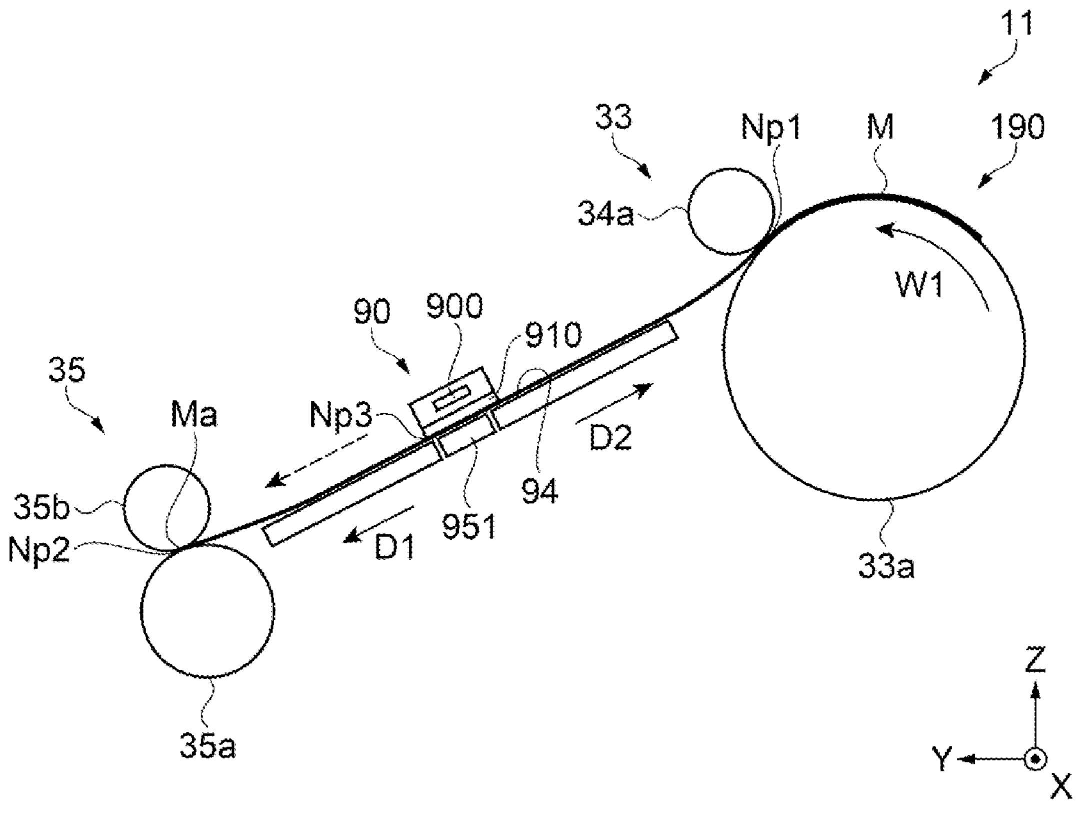
FIG. 7A is a schematic view illustrating a method of controlling the printing apparatus according to the first embodiment.

As illustrated in FIG. 7A, the control unit 58 makes the leading end Ma of the medium M abut on the second nip portion Np2 of the second transport roller pair 35 in a stopped state. Specifically, in a state where the second transport roller pair 35 is stopped, the middle roller 33*a* rotates in the forward direction W1 to convey the medium M in the downstream direction D1.

Figure 7B:
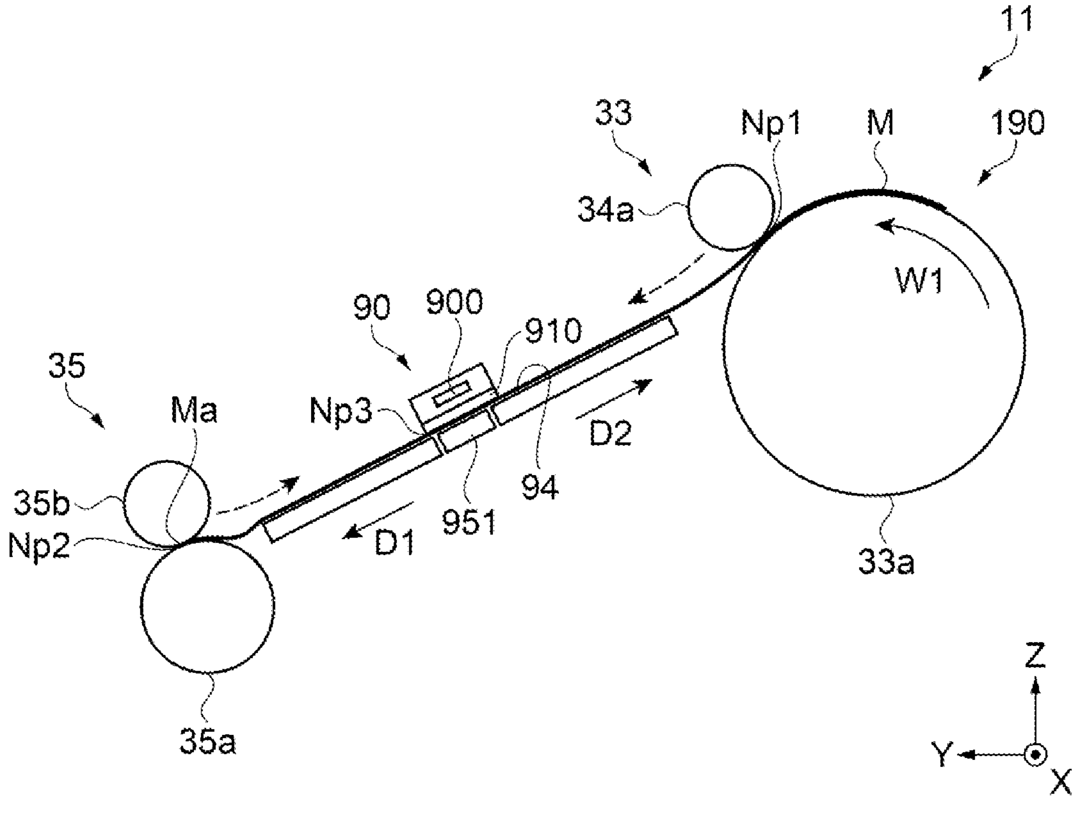
FIG. 7B is a schematic view illustrating a method of controlling the printing apparatus according to the first embodiment.

Next, as illustrated in FIG. 7B, the control unit 58 makes the middle roller 33*a* rotate in the forward direction W1 in a state where the leading end Ma of the medium M is abutted against the second nip portion Np2, to further transport the medium M in the downstream direction D1. As a result, the medium M deflects between the first nip portion Np1 and the second nip portion Np2, so that the leading end Ma of the medium M can be aligned with the second nip portion Np2. In this state, the medium M has deflection formed between the second nip portion Np2 and the third nip portion Np3. The deflection of the medium M is formed to be in a state of protruding toward the downward direction, for example. The deflection may be formed to be in a state of protruding toward the upward direction.

For example, when the medium M is transported with the leading end Ma being skewed relative to the width direction in such a manner that a −X direction side part of the leading end Ma of the medium M is pointing forward, this −X direction side part of the leading end Ma first abuts on the second nip portion Np2. In this state, when the first transport roller pair 33 further transports the medium M in the downstream direction D1, deflection of the medium M is formed between the first nip portion Np1 and the second nip portion Np2 on the −X direction, and a +X direction side part of the leading end Ma abuts on the second nip portion Np2. Deflection of the medium M is formed between the first nip portion Np1 and the second nip portion Np2 also on the +X direction side. Thus, with the deflection of the medium M formed between the first nip portion Np1 and the second nip portion Np2, the leading end Ma of the medium M is aligned with the second nip portion Np2. As a result, the extending direction of the leading end Ma of the medium M matches a width direction X of the printing apparatus 11, whereby the skewing of the leading end Ma of the medium M is corrected.

When the leading end Ma of the medium M abuts on the second nip portion Np2, the deflection of the medium M is formed in the vicinity of the second nip portion Np2, and spreads to the upstream. In the embodiment, the third nip portion Np3 in the image capturing device 90 is disposed between the first nip portion Np1 and the second nip portion Np2. Thus, the deflection of the medium M in the vicinity of the second nip portion Np2 is obstructed by the third nip portion Np3, so as not to spread to the upstream beyond the third nip portion Np3. Thus, the medium M has the deflection formed between the second nip portion Np2 and the third nip portion Np3.

The amount of transport of the medium M in the downstream direction D1 with the leading end Ma of the medium M abutting on the second nip portion Np2 can be set as appropriate. For example, it can be set as appropriate based on factors such as rigidity of the medium M. Thus, the deflection of a predetermined amount suitable for the medium M can be formed.

The amount of transport of the medium M is controlled, with the position of the leading end Ma of the medium M detected. Medium detection sensors that are not illustrated and detect the presence or absence of the medium M are disposed at a plurality of portions on the transport path 30. The medium detection sensors constantly output information about the presence or absence of the medium M detected, to the control unit 58. Thus, the control unit 58 can obtain information indicating whether the leading end Ma of the medium M has passed a detection position of the medium detection sensor.

Figure 7C:
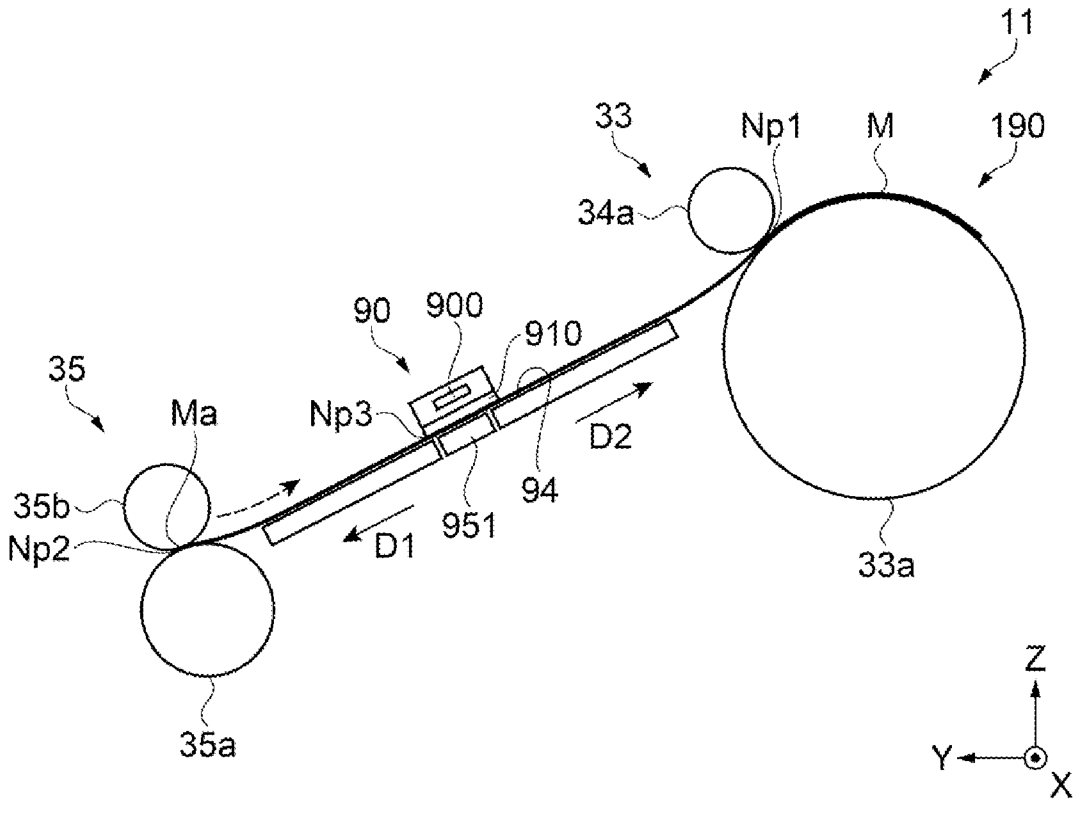
FIG. 7C is a schematic view illustrating a method of controlling the printing apparatus according to the first embodiment.

Next, as illustrated in FIG. 7C, the control unit 58 makes the nipping in the first nip portion Np1 release. The nipping at the first nip portion Np1 is released by putting the middle roller 33*a* of the first transport roller pair 33 in the free rotating state. The releasing of the nip force in the first nip portion Np1 does not necessarily lead to a state with zero nip force, and it suffices if a relaxed state where the deflection of the medium M is released is achieved.

In the embodiment, the nipping at the first nip portion Np1 is released by stopping the energization of the coil of the electromagnetic clutch mechanism 333. As a result, the power from the second drive unit 334 to the middle roller 33*a* is cut off. Thus, the middle roller 33*a* is not driven to rotate and is put in the free rotating state.

When the nipping in the first nip portion Np1 is released in a state where the leading end Ma of the medium M is aligned with the second nip portion Np2 and the deflection of the medium M is formed between the second nip portion Np2 and the third nip portion Np3, the deflection of the medium M is released gradually to the upstream via the third nip portion Np3. Specifically, the nip force in the third nip portion Np3 is relatively weak, and the deflection of the medium M is released toward the first nip portion Np1 via the third nip portion Np3, in a state where the medium M is being nipped by the contact glass 910 and the pressing plate 951. More specifically, with the medium M sliding in the region between the contact glass 910 and the pressing plate 951, the deflection of the medium M is smoothly released. In this manner, the deflection of the medium M is released between the first nip portion Np1 and the second nip portion Np2. With the third nip portion Np3 provided between the first nip portion Np1 and the second nip portion Np2, what is known as kicking which is a phenomenon in which the medium M jumps toward the first transport roller pair 33 from the second nip portion Np2 due to repulsive force of the deflection of the medium M when the nipping in the first nip portion Np1 is released is suppressed. Thus, the skewing corrected state of the medium M is maintained.

With the deflection of the medium M released, the transport of the medium M while having a surface rubbed on the transport guide surface 94 can be suppressed.

Figure 7D:
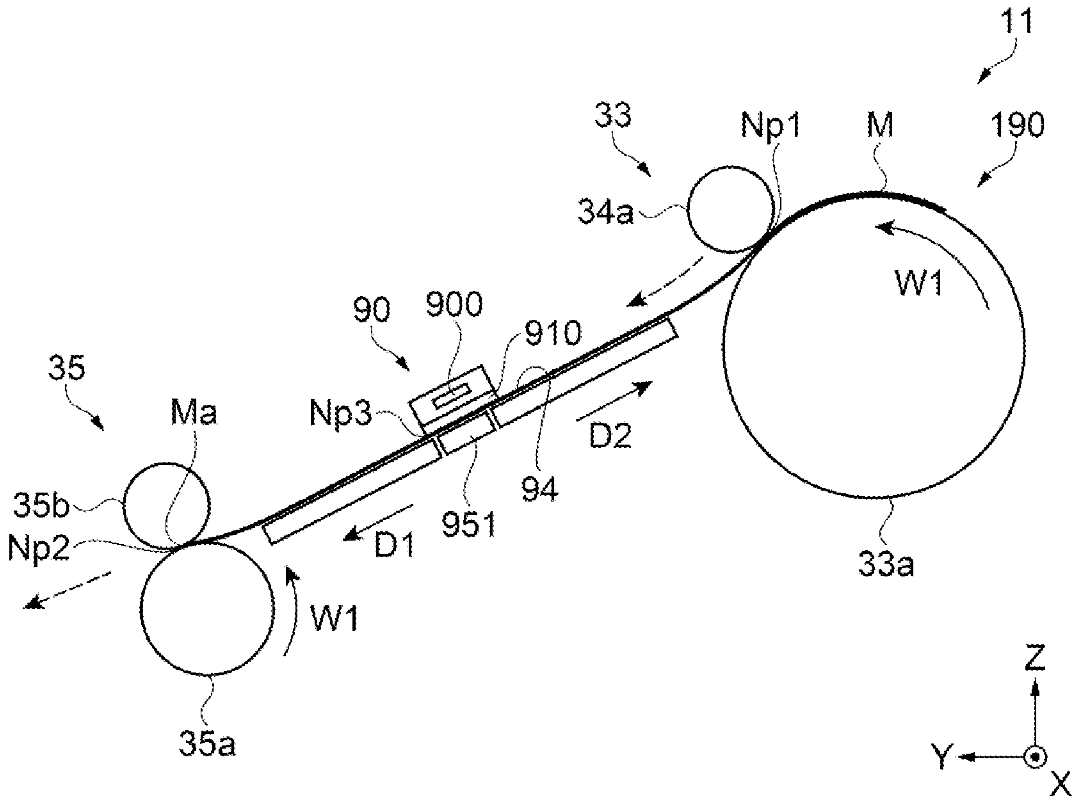
FIG. 7D is a schematic view illustrating a method of controlling the printing apparatus according to the first embodiment.

Next, as illustrated in FIG. 7D, the control unit 58 makes the middle roller 33*a* and the upstream transport driving roller 35*a* rotate in the forward direction W1, to make the first transport roller pair 33 and the second transport roller pair 35 transport the medium M in the downstream direction D1. The medium M is transported to the downstream, in a state where the leading end Ma of the medium M is aligned with the second nip portion Np2 and the deflection between the first nip portion Np1 and the second nip portion Np2 is released. Because the leading end Ma of the medium M is aligned with the second nip portion Np2, when the second transport roller pair 35 rotates in the forward direction W1, the leading end Ma of the medium M is nipped in the second nip portion Np2 while being in a state where the skewing of the leading end Ma of the medium M is corrected. With the medium M in this state transported in the downstream direction D1, the medium M in a skew corrected state can be transported to the printing unit 20.

In the embodiment described above, the third nip portion Np3 is disposed between the first nip portion Np1 and the second nip portion Np2. Thus, the deflection of the medium M can be gradually released using the nip force in the third nip portion Np3. With the nip force in the third nip portion Np3, the kicking of the medium M is suppressed. Thus, the leading end Ma of the medium M is aligned with the second nip portion Np2, and the skew corrected state of the medium M can be reliably maintained.

The image capturing device 90 is disposed between the first nip portion Np1 and the second nip portion Np2. Thus, downsizing of the printing apparatus 11 as well as flexible layout in the printing apparatus 11 can be achieved.

The skew correction operation of the skew correction mechanism 190 can be performed by the control unit 58 as described above, also on the roll paper R fed out from the storage unit 40.

2. Second Embodiment

Next, a second embodiment will be described. The embodiment is different from the first embodiment only in the control method. Thus, duplicate descriptions of the same configuration will be omitted while assigning the same reference signs to the same components.

The method of controlling the printing apparatus 11 of the embodiment will be described below.

Figure 8A:
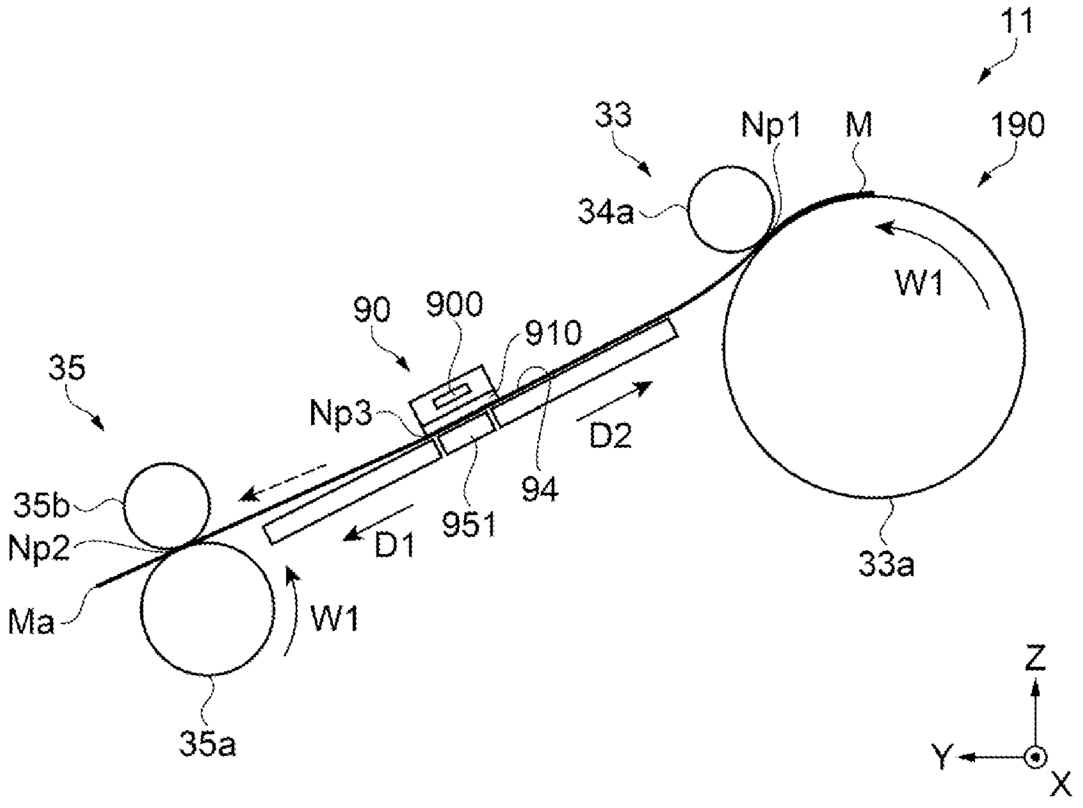
FIG. 8A is a schematic view illustrating a method of controlling a printing apparatus according to a second embodiment.

As illustrated in FIG. 8A, the middle roller 33*a* and the upstream transport driving roller 35*a* rotate in the forward direction W1, to make the first transport roller pair 33 and the second transport roller pair 35 transport the medium M in the downstream direction D1.

When a predetermined amount of the leading end Ma of the medium M passes through the second nip portion Np2, the control unit 58 stops the first transport roller pair 33 and the second transport roller pair 35.

The predetermined passage amount is set as appropriate based on the rigidity of the medium M, the distance between the second nip portion Np2 and the third nip portion Np3, and the like.

Figure 8B:
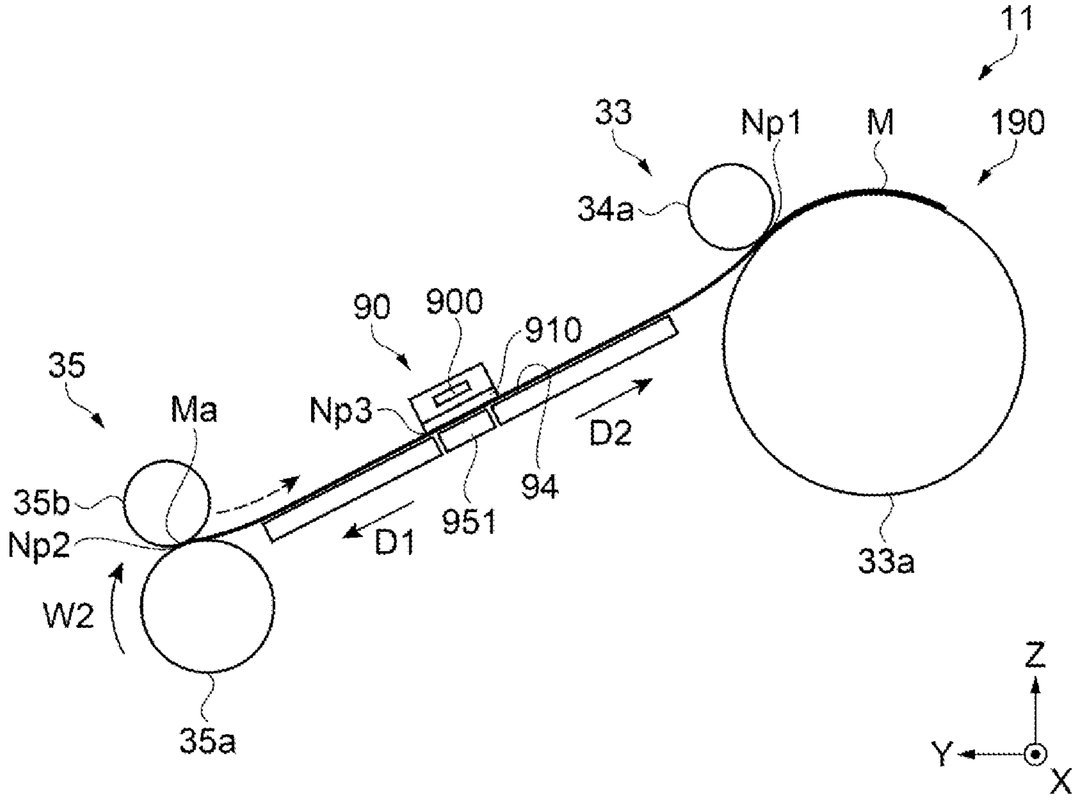
FIG. 8B is a schematic view illustrating a method of controlling a printing apparatus according to the second embodiment.

Next, as illustrated in FIG. 8B, in a state where the nipping at the first nip portion Np1 is released, the control unit 58 makes the upstream transport driving roller 35*a* rotate in the reverse direction W2, to transport the medium M with the leading end Ma of the medium M being positioned upstream of the second nip portion Np2.

In the embodiment, the nipping at the first nip portion Np1 is released by stopping the energization of the coil of the electromagnetic clutch mechanism 333. As a result, the power from the second drive unit 334 to the middle roller 33*a* is cut off. Thus, the middle roller 33*a* is not driven to rotate and is put in the free rotating state. The control unit 58 discharges the leading end Ma of the medium M to the upstream of the second nip portion Np2, to form the deflection of the medium M between the first nip portion Np1 and the third nip portion Np3 for aligning the leading end Ma of the medium M with the second nip portion Np2.

For example, when the medium M is transported to the downstream with the leading end Ma being skewed relative to the width direction X in such a manner that a −X direction side part of the leading end Ma of the medium M is pointing forward, this −X direction side part of the leading end Ma first passes through the second nip portion Np2. In this state, when the second transport roller pair 35 further transports the medium M to the downstream, a +X direction side part of the leading end Ma passes through the second nip portion Np2. Thus, the passage amount is set to make the −X direction side part of the leading end Ma and the +X direction side part of the leading end Ma both pass through the second nip portion Np2 even when the medium M is skewed.

In this state, the control unit 58 makes the second transport roller pair 35 rotate in the reverse direction W2 to transport the medium M to the upstream, with the nipping at the first nip portion Np1 of the first transport roller pair 33 released. After the +X direction side part of the leading end Ma has first passed through the second nip portion Np2, when the second transport roller pair 35 transports the medium M to the upstream, the −X direction side part of the leading end Ma passes through the second nip portion Np2. Thus, the −X direction side part of the leading end Ma and the +X direction side part of the leading end Ma are both discharged to the upstream of the second nip portion Np2. In other words, the leading end Ma of the medium M is entirely discharged to the upstream of the second nip portion Np2.

Because the first nip portion Np1 is released, when the entire leading end Ma of the medium M is discharged to the upstream of the second nip portion Np2, the deflection of the medium M is formed between the first nip portion Np1 and the third nip portion Np3. Thus, with the medium M deflected between the first nip portion Np1 and the third nip portion Np3, the leading end Ma of the medium M is aligned with the second nip portion Np2. The deflection of the medium M spreads and to the upstream via the third nip portion Np3, to be gradually released. In a state where the leading end Ma of the medium M is aligned with the second nip portion Np2, the deflection of the medium M is released between the first nip portion Np1 and the second nip portion Np2.

Next, the control unit 58 makes the middle roller 33*a* and the upstream transport driving roller 35*a* rotate in the forward direction W1, to make the first transport roller pair 33 and the second transport roller pair 35 transport the medium M in the downstream direction D1. The medium M is transported to the downstream, in a state where the leading end Ma of the medium M is aligned with the second nip portion Np2 and the deflection between the first nip portion Np1 and the second nip portion Np2 is released. Because the leading end Ma of the medium M is aligned with the second nip portion Np2, when the second transport roller pair 35 rotates in the forward direction W1, the leading end Ma of the medium M is nipped in the second nip portion Np2 while being in a state where the skewing of the leading end Ma of the medium M is corrected. With the medium M in this state transported in the downstream direction D1, the medium M in a skew corrected state can be transported to the printing unit 20.

With the embodiment described above, the skewing of the medium M can be easily corrected as in the first embodiment.

3. Third Embodiment

Next, a third embodiment will be described.

In the first embodiment, the leading end Ma of the medium M is abutted against the second nip portion Np2 of the second transport roller pair 35 stopped, and in the state where the leading edge Ma of the medium M is abutted against the second nip portion M, the middle roller 33*a* rotates in the forward direction W1 to further transport the medium M in the downstream direction D1. Thus, the leading end Ma of the medium M is aligned with the second nip portion Np2.

On the other hand, in the embodiment, when a predetermined amount of the leading end Ma of the medium M passes through the second nip portion Np2, the upstream transport driving roller 35*a* rotates in the reverse direction W2 in a state where the first transport roller pair 33 is stopped, to transport the medium M in such a manner than the leading end Ma of the medium M is positioned upstream of the second nip portion Np2. Thus, the leading end Ma of the medium M is aligned with the second nip portion Np2.

Even with this configuration, similar advantages as described above can be obtained.

4. Fourth Embodiment

Next, a fourth embodiment will be described.

In the first embodiment, the first nip portion Np1 is released by controlling the electromagnetic clutch mechanism 333 to cutoff power from the second drive unit 334 to the middle roller 33*a*. However, this configuration should not be construed in a limiting sense.

Figure 9:
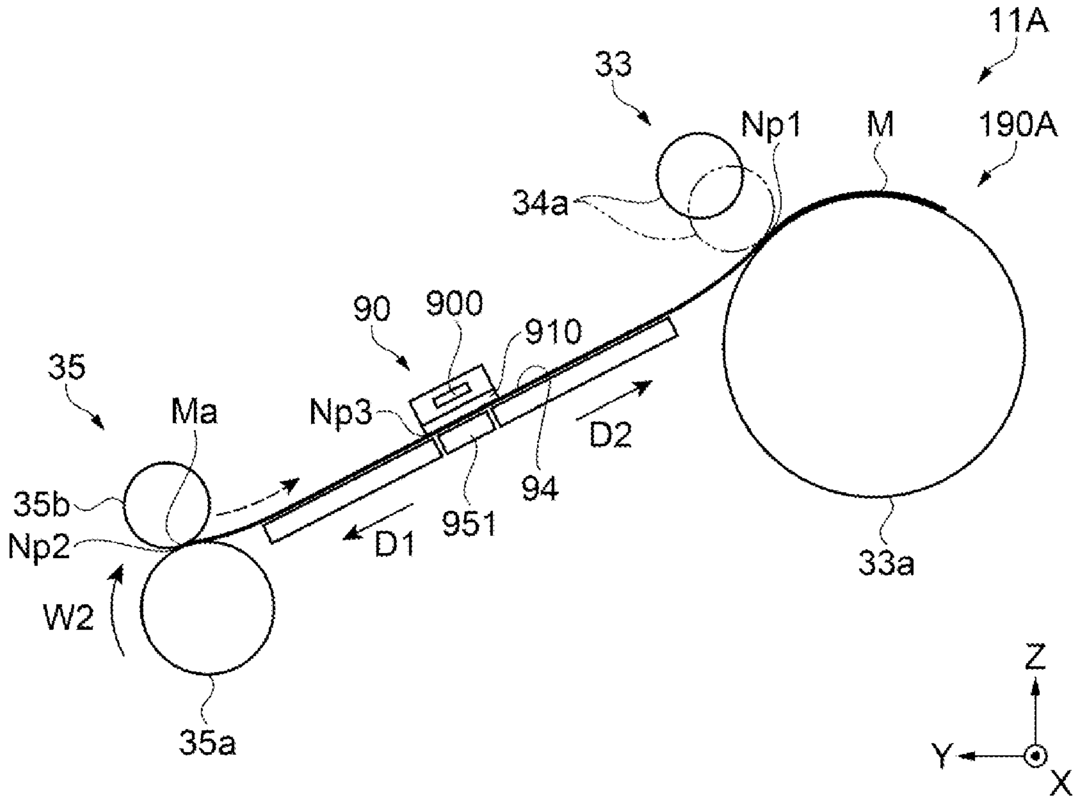
FIG. 9 is a schematic view of a configuration of a skew correction mechanism according to a fourth embodiment.

For example, as illustrated in FIG. 9, in a skew correction mechanism 190A of a printing apparatus 11A according to the embodiment, the driven rollers 34*a* are configured to be separable from the middle roller 33*a*. In this case, a cam mechanism is provided on a rotation shaft of the driven roller 34*a*, and the control unit 58 drives the cam mechanism to make the driven rollers 34*a* relative to the middle roller 33*a*, to transition to a separated state or a contact state (nipping state). Even with this configuration, similar advantages as described above can be obtained.

5. Fifth Embodiment

Next, a fifth embodiment will be described.

While the configuration in which the image capturing device 90 is the device in the printing apparatus 11 of the first embodiment, this should not be construed in a limiting sense. The device may be anything used for purposes other than the transporting of the medium M, and the device may a cutting device 92 for example. The cutting device 92 is a device that has a cutter and is capable of cutting the medium M. The cutting device 92 includes a pressing unit 94 that holds the medium M. Examples of the pressing unit 94 include a roller, a flat plate, and the like. With the pressing unit 94 nipping the medium M from both surfaces, the third nip portion Np3 can be formed.

Even with this configuration, similar advantages as described above can be obtained.

What is claimed is:

1. A printing apparatus comprising:

a first transport roller pair configured to transport a medium while nipping the medium at a first nip portion;

a second transport roller pair disposed downstream of the first transport roller pair and configured to transport the medium while nipping the medium at a second nip portion;

a device disposed between the first transport roller pair and the second transport roller pair in a transport path for the medium and configured to nip the medium at a third nip portion, the device being used for a purpose other than transportation of the medium and the device is a cutting device configured to cut the medium, the third nip portion includes a pressing unit configured to press the medium in the cutting device; and a control unit configured to control the first transport roller pair, the second transport roller pair, and the device, wherein a nip force at the third nip portion is weaker than a nip force at the first nip portion, and the control unit being configured to control nipping of the medium at the first nip portion with a leading end of the medium aligned with the second nip portion, and then releasing the nipping at the first nip portion by freely rotating rollers forming the first transport roller pair.

2. A printing apparatus comprising:

a first transport roller pair configured to transport a medium while nipping the medium at a first nip portion;

a second transport roller pair disposed downstream of the first transport roller pair and configured to transport the medium while nipping the medium at a second nip portion;

a device disposed between the first transport roller pair and the second transport roller pair in a transport path for the medium, and configured to nip the medium at a third nip portion, the device being used for a purpose other than transportation of the medium and the device is a cutting device configured to cut the medium, the third nip portion includes a pressing unit configured to press the medium in the cutting device; and a control unit configured to control the first transport roller pair, the second transport roller pair, and the device, wherein with a nip force at the third nip portion being weaker than a nip force at the first nip portion, the control unit is configured to transport the medium downstream in a state where a leading end of the medium is nipped at the second nip portion, release the nipping at the first portion by freely rotating rollers forming the first transport roller pair, and transport the medium so that the leading end of the medium is positioned upstream of the second nip portion.

3. The printing apparatus according to claim 2, wherein the nipping at the first nip portion is released by putting rollers forming the first transport roller pair in a free rotating state.

4. A method of controlling a printing apparatus, the printing apparatus including a first transport roller pair configured to transport a medium while nipping the medium at a first nip portion, a second transport roller pair disposed downstream of the first transport roller pair and configured to transport the medium while nipping the medium at a second nip portion, and a device disposed between the first transport roller pair and the second transport roller pair in a transport path for the medium, and configured to nip the medium at a third nip portion, the device being used for a purpose other than transportation of the medium and the device is a cutting device configured to cut the medium, the third nip portion includes a pressing unit configured to press the medium in the cutting device, the printing apparatus being configured so that a nip force at the third nip portion is weaker than a nip force at the first nip portion, the method comprising:

transporting the medium downstream in a state where a leading end of the medium is nipped at the second nip portion;

releasing nipping at the first nip portion by freely rotating rollers forming the first transport roller pair; and transporting the medium so that the leading end of the medium is positioned upstream of the second nip portion.

* * * * *